United States Patent [19]

Spurgin et al.

[11] 4,342,274

[45] Aug. 3, 1982

[54] STEERING FAILURE ALARM

[75] Inventors: William T. Spurgin, Charlottesville; Charles R. Wesner, Crozet, both of Va.

[73] Assignee: Sperry Corporation, New York, N.Y.

[21] Appl. No.: 176,945

[22] Filed: Aug. 11, 1980

[51] Int. Cl.³ .......................................... B63H 25/36
[52] U.S. Cl. ............................... 114/144 E; 244/194; 318/588; 340/30; 73/178 R
[58] Field of Search .................... 114/144 E; 244/194, 244/195; 318/565, 588; 340/30, 515, 661, 662, 663, 527, 528, 511; 73/178 R; 364/457

[56] References Cited

U.S. PATENT DOCUMENTS

| | | | |
|---|---|---|---|
| 3,390,614 | 7/1968 | Tatum | 114/144 R |
| 3,493,836 | 2/1970 | Nelson | 318/565 |
| 3,624,479 | 11/1971 | Callas | 318/565 |
| 3,696,282 | 10/1972 | Hirokawa et al. | 114/144 R |
| 3,950,687 | 4/1976 | Watson, Jr. | 318/588 |
| 3,993,138 | 11/1976 | Stevens et al. | 340/515 |
| 4,032,094 | 6/1977 | Morgan et al. | 318/565 |
| 4,055,135 | 10/1977 | Wesner | 114/144 E |
| 4,223,624 | 9/1980 | Iyeta | 364/457 |
| 4,272,711 | 6/1981 | Fukuyama | 318/565 |
| 4,281,811 | 8/1981 | Nixon | 318/565 |

Primary Examiner—Trygve M. Blix
Assistant Examiner—C. T. Bartz
Attorney, Agent, or Firm—Howard P. Terry

[57] ABSTRACT

An apparatus for providing the operator of a marine vessel with an alarm when when a malfunction occurs in the steering system of the vessel. The apparatus utilizes a closed loop simulator to simulate the rudder position, and a comparison of the simulated rudder position to the actual rudder activates the alarm when a predetermined threshold value has been exceeded. Appropriate time delays during which the alarm is disabled make the apparatus adaptable for use with steering systems having a steering gear which has rate inconstancy, and a shaping circuit makes the apparatus adaptable for use with steering systems having a steering gear which has static positional nonlinearity.

4 Claims, 5 Drawing Figures

STEERING FAILURE ALARM

BACKGROUND OF THE INVENTION

1. Field of the Invention

The invention relates to alarms, and more specifically to steering failure alarms for warning an operator of malfunctions in marine steering systems having either linear or nonlinear rudder positioning machinery and either constant or inconstant rate characteristics.

2. Description of the Prior Art

Marine vessels are known to be equipped with steering failure alarms which warn the operator of malfunctions in steering systems having linear rudder positioning machinery and constant rate characteristics. One type of steering failure alarm, for example, disclosed in U.S. Pat. No. 4,055,135 and assigned to the Applicants' assignee, detects malfunctions in steering systems having linear rudder positioning machinery and constant rate characteristics almost immediately after the initiation of a rudder maneuver by utilizing a closed loop simulator. Electrical helm order signals and rudder angle position signals provided by transducers are applied to the closed loop simulator which includes integrating apparatus adjusted to provide a time variant simulated rudder angle signal. The simulated rudder angle signal varies linearly in the same manner that the actual rudder signal would vary in the absence of a malfunction. The simulated and actual rudder angle signals are compared in a summing amplifier whose output is applied to a threshold circuit which activates an alarm whenever the instantaneous values of the simulated and actual rudder angle signals differ by more than a predetermined amount.

The above described apparatus is suitable for use only with steering systems having linear rudder positioning machinery where the static or settled positional accuracy of the rudder is linear with respect to helm position, and having rudder rate characteristics which are constant from one maneuver to the next and which are independent of rudder position. Many actual systems, however, are inconstant in rate characteristics and/or nonlinear in positional accuracy. Some systems, e.g., the Rapson slide, are intrinsically inconstant in rate characteristics because of their geometry, with the variation becoming significant at larger angles, e.g., 30 to 45 degrees. The Rapson slide system is substantially constant in rate characteristics at smaller angles, e.g., 0 to 30 degrees. Depending upon the particular system, the geometry results in the rudder moving at a faster or slower rate at certain angular positions than it does at other angular positions. Moreover, aside from the aforementioned geometric rate inconstancy, a steering system may exhibit rate inconstancy as a result of loose, worn, or misadjusted linkages in the mechanism which controls its power source, e.g., a variable delivery hydraulic pump. Such linkages may cause the rudder rate characteristics to vary between left-going and right-going movements or between successive movements in the same direction. Consequently, when the above-described steering failure alarm is operatively coupled to a steering system exhibiting inconstant rudder rate characteristics, false alarms may result; although the simulated and actual rudders may start from the same position, the inconstancy of the actual rudder's rate characteristics may cause the rudder position, after a certain elapsed time period of a given rudder maneuver, to vary from the simulated rudder position by more than the predetermined value necessary to activate the alarm.

Furthermore, some systems, e.g., Rapson slides where position feedback for the final servo loop is taken from ram position rather than the rudder stock, exhibit static positional nonlinearity. Again, this nonlinearity is most significant at larger, e.g., 30 to 45 degrees, angles. This nonlinearity may cause the actual rudder's static position to vary from the static position of the simulated rudder by an amount which exceeds the predetermined value necessary to activate the alarm.

Accordingly there is a need for an immediate-response type steering failure alarm adaptable for use with all steering systems whether they are constant or inconstant in rate characteristics and whether they are linear or nonlinear with respect to static position.

SUMMARY OF THE INVENTION

The apparatus of the present invention provides an immediate response type steering failure alarm which utilizes a closed loop simulator and which is adaptable for use with marine steering systems having either linear or nonlinear rudder positioning machinery and having either constant or inconstant rate characteristics. Order signals indicative of the ship's helm position are applied to a closed loop simulator which develops a simulated signal representative of the expected linear, constant rate characteristic response of the rudder to that order signal. The simulated signal is compared with a signal representative of the actual rudder position. If the apparatus is set for a linear, constant rate characteristic mode of operation, an alarm is activated whenever the instantaneous values of the simulated and actual rudder angle signals differ by more than a predetermined amount as described in U.S. Pat. No. 4,055,135. If, however, the steering gear has static positional nonlinearity as described above, one of the signals can be shaped by circuits in the present invention to match the other signal.

Furthermore, if the steering gear has rate inconstancy, the apparatus of the present invention can be set to compare the actual and simulated rudder angle signals for the initial period of a rudder maneuver, during which differences resulting from failure of the steering gear to function may be detected and used to activate the alarm. During the balance of the rudder maneuver, however, when rate characteristic inconstancy might cause the instantaneous difference between the actual and simulated rudder signals to exceed the predetermined value necessary to activate the alarm, the alarm circuit is disabled. The reenabling of the alarm is delayed for a predetermined time period during which the rudder should have reached its ordered position. Thereupon the actual rudder position is compared to the ordered position, and if the difference exceeds the predetermined amount necessary to activate the alarm, the alarm is activated. The length of this time period is determined by the magnitude of the intended rudder maneuver.

DESCRIPTION OF THE PREFERRED EMBODIMENT

The apparatus of the present invention is adapted for use with marine vessel steering systems of the types having either linear or nonlinear rudder positioning machinery. In a linear positioning system, the rudder position varies linearly with helm position, whereas in a nonlinear positioning system the rudder position varies nonlinearly with respect to helm position. This nonlinearity may result from the utilization of a Rapson slide having ram-position rather than rudder-position feedback.

Furthermore, the apparatus of the present invention is adapted for use with marine vessel steering systems having either constant rate characteristics or inconstant rate characteristics, without regard as to whether that inconstancy is caused by its geometry, by linkages in its positioning control system, or by both.

Conventionally, the rudder positioning machinery is controlled by either an automatic or manual helm. In manual helm systems, electrical rudder orders are developed by a synchro or potentiometer mechanically actuated by the helm. In automatic helm systems, electrical signals may be developed directly by the automatic unit. In both types of system a second electrical signal indicative of the rudder angle is compared with the order signal and the difference, or error signal, is used to activate the rudder positioning machinery.

Figure 1:
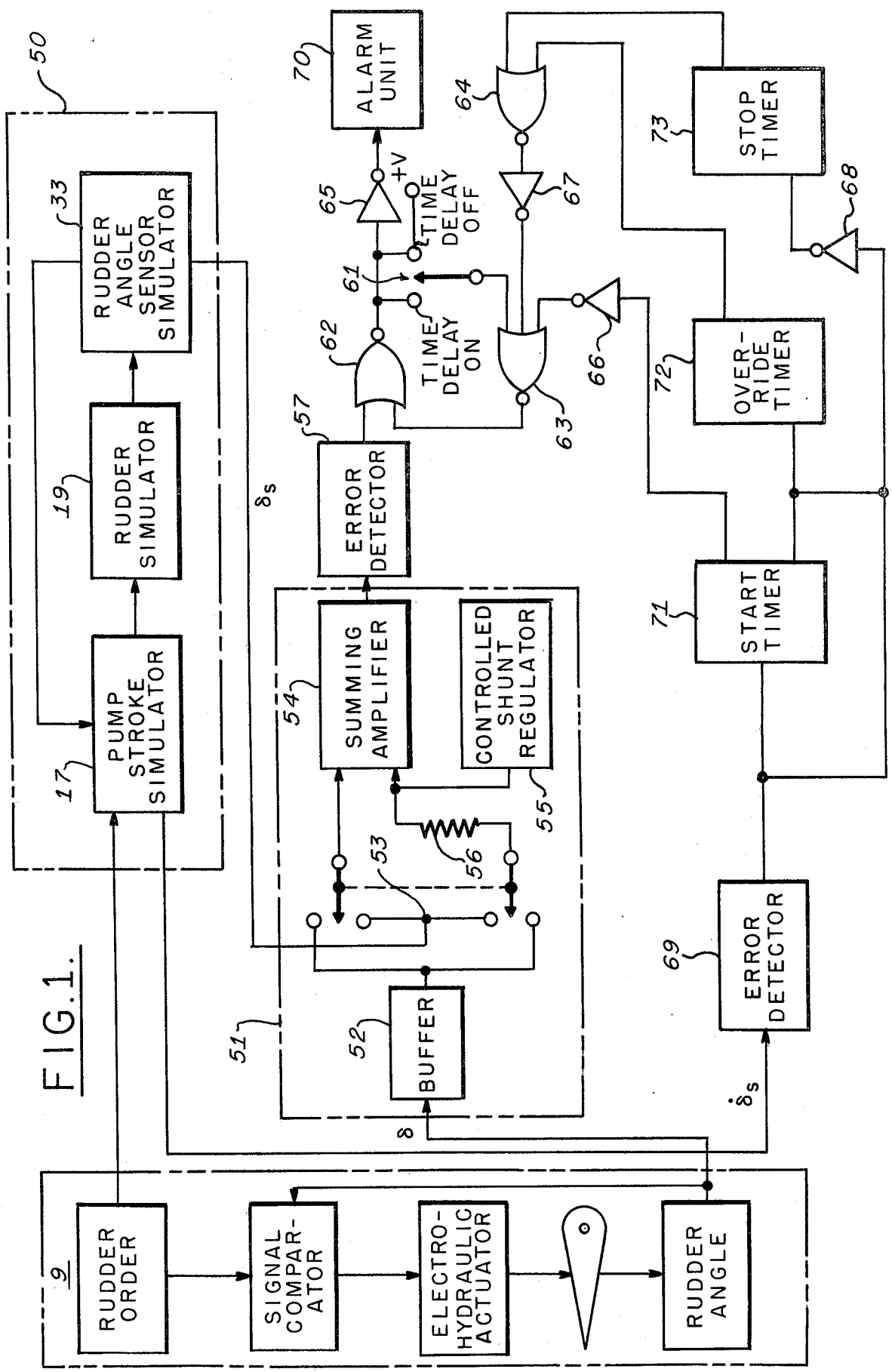
FIG. 1 is a block diagram of a circuit employing the principles of the invention.

Referring now to FIG. 1, a block diagram depicts a circuit which employs the principles of the present invention and which may be operatively coupled to a marine steering system 9 of the type described above. The present invention includes a closed loop simulator 50 which is comprised of a pump stroke simulator 17, a rudder simulator 19, and a rudder angle sensor simulator 33, and which is described in U.S. Pat. No. 4,055,135, assigned to the Applicants' assignee. A rudder order signal and a signal $\delta$ representative of the actual rudder angle, which are both output signals from the steering system 9, are applied as input signals to a shaping circuit 51 and to the closed loop simulator 50, respectively. In practice the rudder order signal and the rudder angle signal $\delta$ may be taken from separate transducers coupled to the helm and rudder so as to maintain the alarm circuits separate from and independent of the steering control system. The separate alarm transducers will have characteristics substantially identical to those of the steering control system transducers. The closed loop simulator 50 simulates the rudder positioning machinery and associated sensors, and it provides a simulated rudder angle output signal $\delta_s$ as described in the above referenced patent.

A shaping circuit 51 receives the input signal $\delta_s$ representative of the simulated rudder angle from the angle sensor simulator 33 included within the closed loop simulator 50. The shaping circuit 51 also receives the input signal $\delta$ representative of the actual rudder angle from the steering system 9. The input signal $\delta$ is buffered by the buffer 52 and applied to switching means 53 which selects either input signal for shaping. The signal $\delta_s$ needs no buffering since it is the output of an operational amplifier included within the rudder angle sensor simulator 33 as taught in the above referenced patent. The switching means selectively applies the signals $\delta$ or $\delta_s$ to a resistor 56 which has a bipolar controlled shunt regulator 55 coupled thereto. The controlled shunt regulator 55 controls the gradient at the resistor 56, and depending upon the position of the switching means 53, either $\delta$ or $\delta_s$ is selectively applied to the resistor 56 while the non-selected signal is directly applied to a summing amplifier 54. The summing amplifier 54 sums the signals $\delta$ and $\delta_s$ and produces a difference signal $\delta - \delta_s$.

The difference signal $\delta - \delta_s$ is applied to an error detector 57. The error detector 57 is a bipolar device, i.e., responsive to either positive or negative voltages, of a type disclosed in U.S. Pat. No. 3,626,214, entitled "Bipolar Input Bistable Output Trigger Circuit," assigned to the Applicants' assignee. The error detector includes a potentiometer, whereby a threshold value is set such that when the difference between $\delta - \delta_s$ exceeds a voltage corresponding to say 5°, a trigger pulse is applied to an alarm unit 70 via logic gates 62, 65.

The apparatus of the present invention, however, provides that the alarm unit 70 is not always responsive to the trigger pulse of error detector 57, thereby allowing the apparatus to be adapted to steering systems having inconstant rudder rate characteristics. A second error detector 69 of the type disclosed in U.S. Pat. No. 3,626,214 is operatively coupled to the alarm unit 70 via the plurality of logic gates 62–68 and a plurality of timers 71, 72, 73. The timers 71, 72, 73 and the logic gates 62–68 utilize a time delay technique to disable the alarm unit 70, when an output signal $\delta_s$ from the pump stroke simulator 17 exceeds a predetermined threshold value determined by the error detector 69, as hereinafter described. Preferably, the timers are of a commercially procurable type, e.g., Model Number MC 14541, manufactured by Motorola Corporation. Moreover, the timers 71, 72, and 73 are responsive to switching means 61 such that the alarm unit 70 need not be disabled by the time delay technique of the present invention. Consequently, the apparatus may be utilized effectively with steering systems having either constant or inconstant rudder rate limit.

Figure 2A:
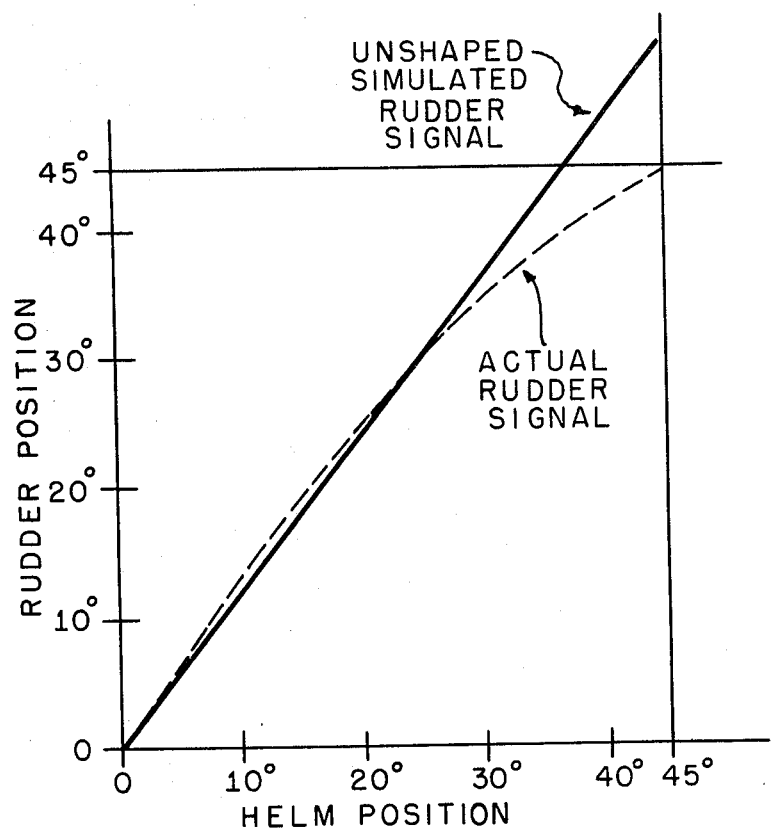
FIGS. 2a and 2b are graphs which depict the operating characteristics of the present invention in systems with nonlinear rudder positioning machinery.
Figure 2B:
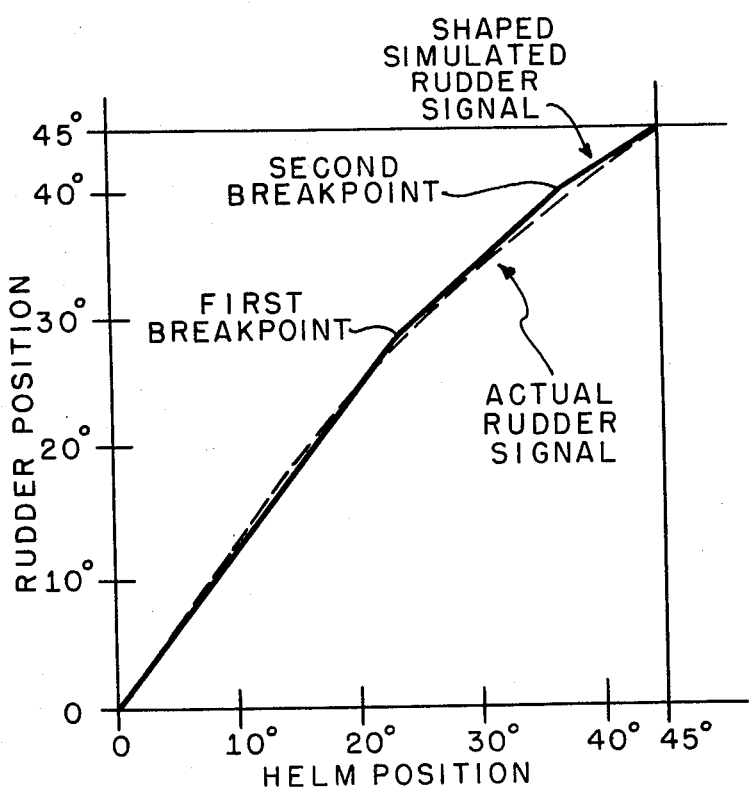

Referring now to FIGS. 2a and 2b, graphs depict the plots of simulated and actual rudder positions provided by a representative steering system which has nonlinear rudder positioning machinery and which is coupled to the apparatus of the present invention. The representative nonlinear steering system is of a type in which the 0°–30° range of rudder positioning is substantially linear and the rudder positioning beyond 30° is nonlinear. The graphs are representative of a Rapson slide with ram position feedback, and show static rudder position after the rudder servo has moved the rudder to its ordered position. FIG. 2a shows the relationship of the unshaped simulated rudder signal to the actual rudder position signal. FIG. 2b shows the relationship of the simulated rudder signal to the actual rudder position signal after the simulated rudder signal has been shaped by the controlled shunt regulator 55. If the non-linearity were such that the actual rudder position signal were to exceed the value of the simulated rudder signal at the extreme angle, the switching means 53 would be set so that the actual rudder position signal, rather than the simulated signal, would be shaped by the controlled shunt regulator 55.

Figure 3:
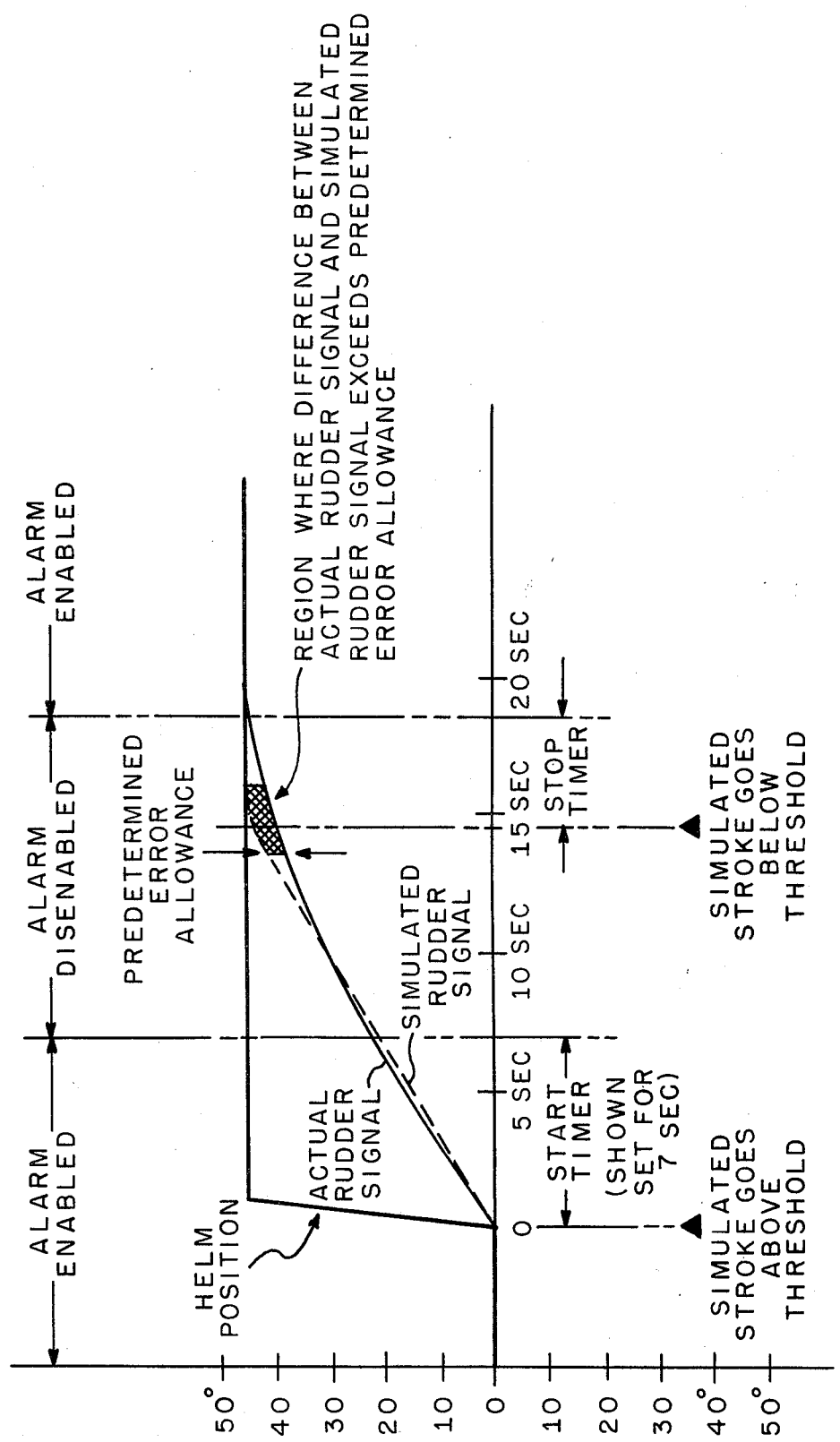
FIGS. 3 and 4 are graphs which depict the operating characteristics of the present invention in systems with inconstant rate characteristics.

Referring now to FIG. 3, a graph depicts the plot of simulated and actual rudder positions as a function of time during a given rudder maneuver. The representative inconstant rate system is of a type in which the rate characteristic in the 0°–30° range of rudder positioning is substantially constant but slows significantly at rudder angles beyond 30°. The graph is representative of a Rapson slide.

Illustratively, when a left helm order signal of 45° is applied to the system, the helm position, the simulated rudder position and the actual rudder position may be plotted as a function of time as in FIG. 3. Thus it can be appreciated that the helm reaches its ordered position in less than approximately two seconds, whereas the actual and simulated rudder positions require considerably more time before the ordered position is reached. During most of this time the steering system is in rate limit. It can be further appreciated the actual rudder position during the maneuver varies nonlinearly with respect to time because of the inconstant rudder rate characteristic and that the simulated rudder position varies linearly with respect to time.

Figure 4:
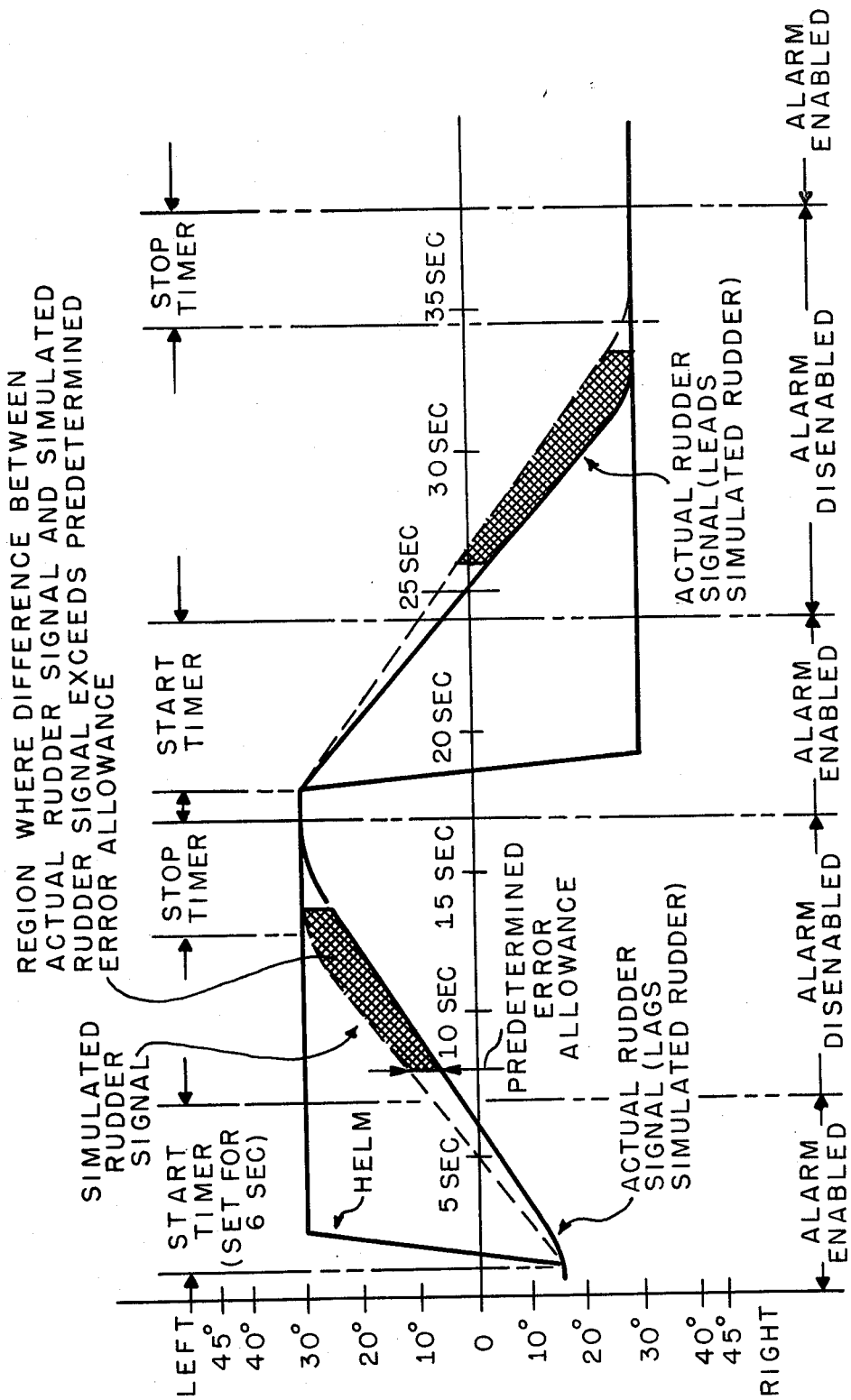

Referring now to FIG. 4, a graph similar to FIG. 3 depicts the plot of simulated and actual rudder positions as a function of time during two subsequent rudder maneuvers. The representative inconstant rate system is of a type in which the linkages controlling a variable delivery hydraulic pump are worn or misadjusted so that the pump flow differs between left-going and right-going maneuvers. In the represented system, rudder rate limit is slower in left-going maneuvers than in right-going maneuvers. It can be appreciated that during a given maneuver with such a system the actual rudder position signal may differ appreciably from the simulated rudder signal, even though both may have started from substantially the same point, and both may move at substantially the same average rate over a number of maneuvers. It can also be appreciated that a given steering system may incur dynamic errors because of both rate inconstancy related to both geometric causes as depicted in FIG. 3 and linkage causes as depicted in FIG. 4.

The apparatus of the present invention may be calibrated to match the rate characteristics of its simulated rudder position to the average rate characteristics of the actual rudder position. It does not, however, attempt to provide calibration to deal with inconstancy of rate characteristics; it can be appreciated that this would be virtually impossible. The utilization of appropriate time delays during which the alarm is disabled, however, prevents the apparatus of the present invention from providing false alarms as hereinafter described and, thus, makes it adaptable for use with steering systems having inconstant rate characteristics, regardless of the cause of such inconstancy.

Referring again to FIG. 1, the operation of the apparatus of the present invention will be explained in the context of the block diagram depicted therein. The apparatus includes the switching means 61 which allows the apparatus to be used with steering systems having constant rudder rate characteristics when the switch is in the "time delay off" position and for use with steering systems having inconstant rudder rate characteristics when the switch is in the "time delay on" position. The apparatus operates substantially similar to the steering failure alarm in referenced U.S. Pat. No. 4,055,135 when set in the "time delay off" mode, but when set in the "time delay on" mode, it operates to prevent false alarms which would otherwise make the prior art steering failure alarm unadaptable for use with a steering system having inconstant rudder rate characteristics.

False alarms are prevented by introducing predetermined time delays during which the alarm unit 70 is disabled. These time delays are triggered by the error detector 69 which is responsive to an output signal $\delta_s$ from the pump stroke simulator 17. In the absence of a rudder order signal the alarm 70 is constantly enabled so as to detect rudder motions not initiated by the helm. When the rudder order signal causes output signal $\delta_s$ from the pump stroke simulator 17 to exceed a predetermined threshold value, e.g., 10%, the error detector 69 provides a trigger pulse to activate the start timer 71 and the override timer 72. The activation of the start timer 71 maintains the alarm 70 enabled, but not necessarily activated and permits an initial comparison of $\delta$ to $\delta_s$ by error detector 57 to activate the alarm unit 70, if the error exceeds the predetermined value. Upon the timing out of the start timer 71, however, the alarm unit 70 is disabled. Preferably the start timer 71 is set to provide a 3 to 10 second timing period depending upon the rudder positioning machinery for which the apparatus is adapted. The alarm unit 70 continues to be disabled until such time as the rudder should have reached its ordered position, whereupon the stop timer 73 continues to disable the alarm unit 70 until it is timed out. Preferably, the stop timer 73 has a timing period of approximately four seconds. At the conclusion of this timing period the alarm is reenabled and the actual rudder position may be compared to the ordered rudder by the error detector 57 to activate the alarm unit 70, if so indicated. The override timer 72 would, if necessary, reenable the alarm at the conclusion of its timing period which is preferably on the order of 50 seconds. The purpose of the override timer 72 is to override timers 71, 73 in case a failure occurs in the alarm circuits which would otherwise keep the alarm unit 70 disabled. A representative example of when the alarm unit 70 may be enabled and disabled is depicted within the graphical illustration of FIGS. 3 and 4.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An improved ship's steering failure alarm which is adaptable for use with steering systems having non-linear rudder positioning and either constant or inconstant rate characteristics; and which is of the type having means for providing simulated and actual rudder position signals, means for comparing said simulated and actual rudder position signals, and means for providing an alarm activating signal when a comparison threshold has been exceeded; wherein the improvement comprises:

means for shaping either said simulated or actual rudder position signals when a non-linear relationship exists between said actual and said simulated rudder signals;

first timing means for disabling said alarm activating signal after an initial comparison period and prior to a period when a substantially inconstant rate relationship exists between said actual and said simulated rudder signals; and second timing means for reenabling said alarm activating signal after the rudder should have reached its ordered position.

2. An apparatus according to claim 1 which further includes third timing means for reenabling said alarm activating signal when said first timing means or said second timing means malfunctions.

3. An apparatus according to claim 2 which further includes switching means for making said means for providing an alarm activating signal non-responsive to said first, second, and third timing means.

4. An apparatus according to claim 3 wherein said shaping means includes switching means for selecting either said actual or simulated rudder position signal for shaping by controlled shunt regulator means.

* * * * *